2,370,733

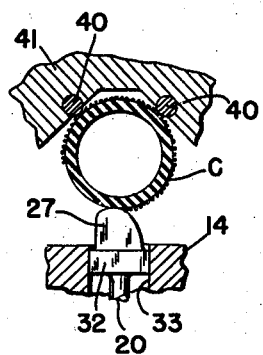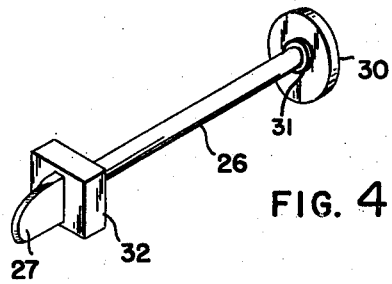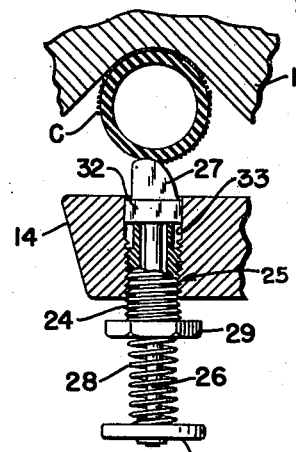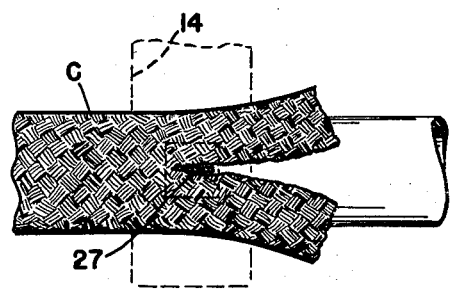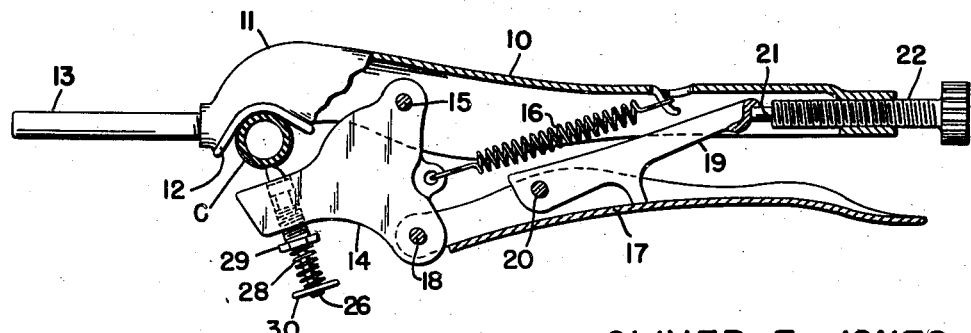
FIG. 5
FIG. 4
FIG. 2
FIG. 3
FIG. 1
OLIVER E. JONES
*INVENTOR*
BY *Smith & Tuck*
ATTORNEY Patented Mar. 6, 1945

UNITED STATES PATENT OFFICE 2,370,733

CUTTING TOOL FOR WIRE COVERINGS

Oliver E. Jones, Seattle, Wash.

Application August 24, 1943, Serial No. 499,817

3 Claims. (Cl. 30—91)

My invention relates to a cutting tool for wire coverings useful for severing the sheathing and insulation on electrical cable, and particularly useful in cutting woven wire armor and the insulation thereunder of a type commonly used in an electrical circuit aboard ships.

With particular reference to electrical installations in sea-going vessels, I have found that much time and great energy has been expended in stripping and exposing the electrical conductors of an armored cable of the type having a woven-wire exterior wrapping, due to the fact that the wire wrapping is extremely tough and resists ordinary cutting means, and due also to the fact that immediately under the wire wrapping is a layer of semi-resilient rubber insulation which does not afford adequate backing for any cutting mechanism when pressure is applied from externally of the armor. Pocket knives and other similar implements have been used but the operation is both slow and dangerous because the armor resists cutting and on occasion will deflect the knife blade, which under force is liable to injure the workman or his companions. Two types of cutting operations are involved in exposing the electrical conductor of such a cable; the cable must be cut circumferentially to separate that portion of the armor that is to be removed from that portion which is to remain, and it must be cut longitudinally to divide the sheath that is to be removed and permit its separation from the underlying insulation. No single tool heretofore has been available which would rapidly and efficiently perform such a similar operation.

Having in mind the defects of the prior art, it is an object of my invention to provide a cutting tool which can be employed to circumferentially score the armor of an electrical cable to divide the armor that is to be removed from that which is to remain upon the cable and without injury to the underlying conductor cable.

Another object of my invention is to provide, in a cutting tool of the type described, a scoring member to cut the armor longitudinally without injury to the underlying conductors, and which cutter can be rapidly moved longitudinally of the cable to quickly perform its cut upon the curved surface in which the cutter is operating.

A still further and more specific object of my invention is to provide in a cutting tool of the type described, a cutter which operates in a shearing action and is not materially affected by hard usage or the resistance produced by the material of the tough armor.

Still another object of this invention is the provision of cutting tool mechanism which may be incorporated in gripping devices having opposed jaws, one of which receives and supports the cable being stripped and the other of which carries the cutter knife in a manner that the depth of cut may be easily regulated to meet varying conditions as to size and pressures required.

The foregoing objects and others ancillary thereto I have preferred to accomplish as follows: according to a preferred embodiment of my invention, I incorporate my cutting mechanism in the jaws of the "Vice-Grip" type pliers, a tool of the type in which the relative spacing of the two jaws in their closed position, may be accurately adjusted while the jaws are in their open position and then, by closing a pivoted lever, and bringing the jaws to the predetermined relative positioning for closure together. Preferably upon the non-movable jaw I provide a saddle to receive the cable which is to be stripped and which jaw also carries a longitudinally protruding horn to facilitate the manual handling of the tool under certain circumstances. In the movable jaw is mounted the knife in opposition to the saddle of the fixed jaw. Under certain circumstances, the fixed jaw is provided with antifriction rollers or similar means to permit the turning of the fixed jaw with relation to the cable being there supported. The cutter or knife is splined to fit a socket of similar shape and, on occasion, is movable in said socket to displace the spline from the socket and permit the knife to be turned about its axis for cutting in at least two directions. The splining on the knife is usually drawn into the socket by resilient means, but may be manually extruded from the socket to permit the axial rotation mentioned above.

The novel features that I consider characteristic in my invention are set forth with particularity in the appended claims. The invention itself, however, both as to its organization and its method of operation, together with additional objects and advantages thereof, can best be understood from the following description of a specific embodiment when read in connection with the accompanying drawing, in which:

Figure 1 is a side view of a tool with portions broken away for convenience of illustration, having my cutter mechanism embodied therein;

Figure 2 is an enlarged view of the cutter mechanism of Figure 1 with portions shown in sections and broken away for convenience of illustration;

Figure 3 is a plan view of a portion of cable illustrating the manner in which a longitudinal cutting action is performed with my mechanism.

Figure 4 is a perspective view of the knife, and

Figure 5 is a view similar to Figure 2 illustrating a modified form of cable saddle employed in connection with my cutting mechanism.

A cutting tool for wire coverings to overcome the defects herebefore enumerated, must have at least two totally distinct characteristics; it must be capable of circumferentially and longitudinally cutting the armor of an electrical cable without injury to the underlying conductor members of the cable; and it also must rapidly shear the tough material of the armor in both types of cut with ease at high speed. Accordingly, a preferred embodiment of my invention, referring to Figure 1 of the drawing, is incorporated in a "Vice-Grip" type tool. Such a tool comprises a handle 10 having a fixed jaw 11 which is provided with a saddle 12 and, in this specific showing, has a longitudinally extending horn 13. In opposition to the fixed jaw 11 is the movable jaw 14, pivoted at 15 and generally drawn toward the open position by means of the spring 16. Jaw 14 is forced into the closed position by bringing together the fixed handle 10 and the swinging handle 17. Handle 17 is pivoted at 18 to jaw 14 and, when brought toward the fixed handle 10 applies pressure to jaw 14 through the instrumentality of the intermediate link 19 to which it is pivoted at 20. Link 19 is seated against the movable base pin 21 on the screw 22.

The cutting mechanism comprises the threaded bushing 24 which is threadedly engaged in passage 25 of jaw 14. The shank 26 of the knife 27, as shown in Figure 4, passes through or is inserted into the tubular central passage of the bushing 24 and a spring 28 between the head of the bushing 29 and seat 31 on the head 30 on pin 26 tends to draw the knife toward the bushing, as can be seen in Figure 2. Adjacent the base of the knife is the squared head 32 which serves as a splining that engages in the squared opening 33 for determining the relation in which the knife 27 is presented to the fixed jaw 11 and a cable seated therein.

For clear understanding it is to be seen from Figures 1, 2, and 5 that the knife 27 is presented in a manner to circumferentially cut the armor from the cable C in the various views. In order to longitudinally cut the cable as is indicated in Figure 3, pressure is applied to the thumb button 30 to compress the spring 28 and to extrude the squared portion 32 of the knife from the squared opening 33, whereby the knife may then be turned to any one of several positions. For longitudinally splitting, the knife 27 is disposed at a right angle to the showing in Figure 2.

In using the tool an operator adjusts by means of the screw 22 the spacing between the jaws 11 and 14 according to his experience and knowledge, so that when the jaws are brought together in the closed position by closing the handles 10 and 17 together the knife blade will be presented to the armor of the cable seated in the saddle 12 with sufficient pressure and protrusion to cut the armoring of the cable. In circumferential cutting the tool is of course swung readily around the axis of the cable. In longitudinal cutting, the tool is drawn along the length of the cable parallel to its axis and one side of the sheath surface is cut and spread apart in a manner in which it can be easily removed.

An important feature of the invention relates to the shape of the knife 27, which of course has a sharp edge along its curved contour, but which is not pointed for the purposes of penetration but rather curved in a manner that, as it travels over the wires of the armor being cut, it will shear the wires, even though their resilient backing should give under the pressure being applied.

To facilitate the circumferential cutting, in certain instances, I provide anti-friction rollers 40 in jaw 41 as may be seen in Figure 5 to cradle the cable as it is cut.

Having thus described my invention, I claim:

1. In a cutting tool for wire coverings, a jaw provided with a socket having grooved ways therein, a knife having a shank adapted to fit in said socket and its ways, resilient means to retain said shank drawn into said socket, and a saddle jaw to receive a cable to be stripped, said jaws being movable relative each other.

2. In a cutting tool for wire coverings, a jaw provided with a passage including an enlarged socket having grooved ways therein, a knife having a shank to slide in said passage and an enlarged shank adapted to fit in said socket and its ways, means to resiliently retain said knife and its enlarged shank drawn into said enlarged socket, and a saddle jaw to receive a cable to be stripped, said jaws being movable relative each other.

3. In a cutting tool for wire coverings, a base member to be moved relative a wire to be stripped, said member having a passage therethrough and including an enlarged socket portion provided with grooved ways therein, a knife having a shank to slide in said passage and an enlarged shank adapted to fit in said socket and its ways, means to resiliently retain said knife and its enlarged shank seated in said enlarged socket.

OLIVER E. JONES.